April 5, 1932.　　　H. A. BURT　　　1,851,966
KEYBOARD MECHANISM
Filed Nov. 29, 1929　　　2 Sheets-Sheet 1
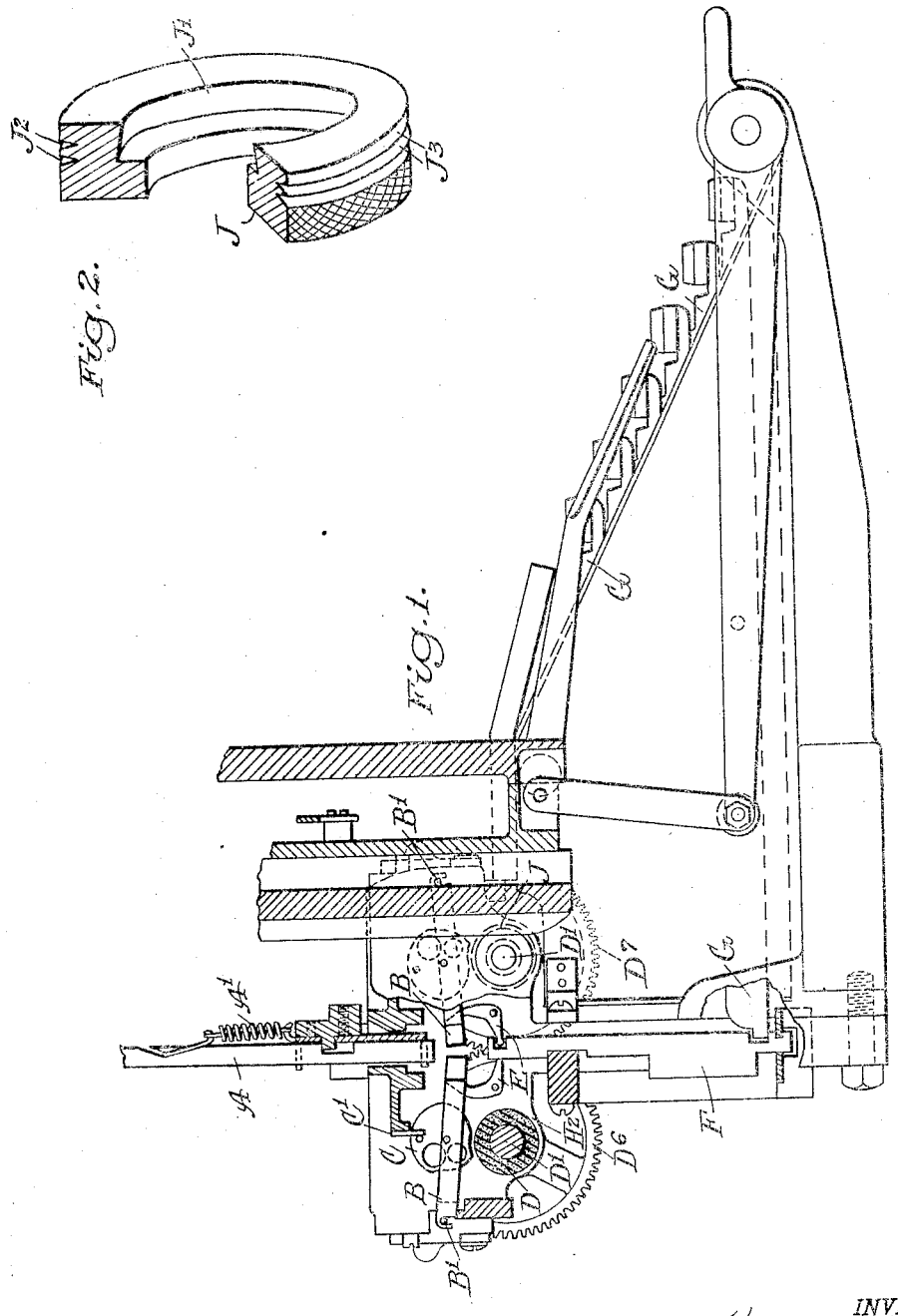
INVENTOR
Harold A. Burt
BY
ATTORNEYS April 5, 1932.   H. A. BURT   1,851,966
KEYBOARD MECHANISM
Filed Nov. 29, 1929   2 Sheets-Sheet 2
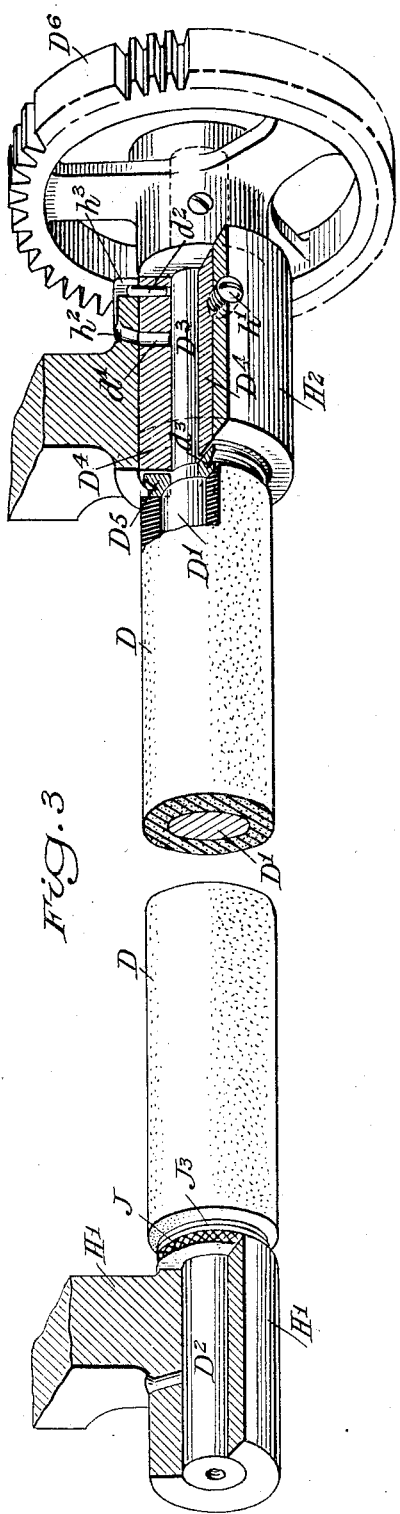
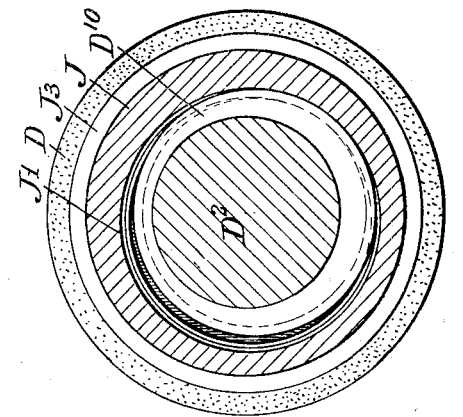
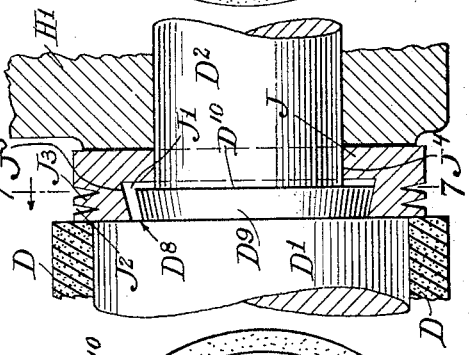
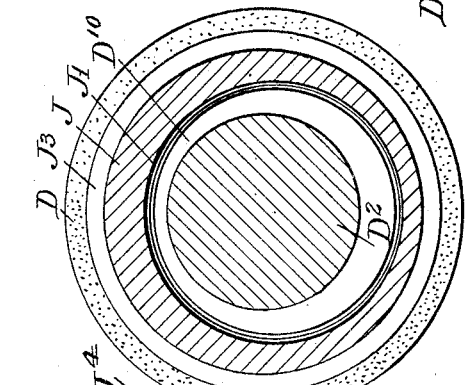
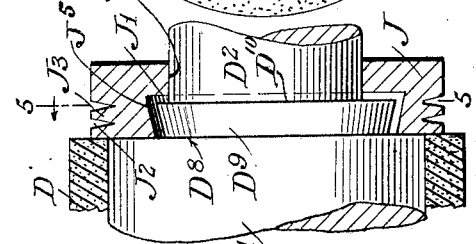
INVENTOR
Harold A. Burt
BY
ATTORNEYS Patented Apr. 5, 1932

1,851,966

UNITED STATES PATENT OFFICE

HAROLD A. BURT, OF ST. ALBANS, NEW YORK, ASSIGNOR TO MERGENTHALER LINOTYPE COMPANY, A CORPORATION OF NEW YORK

KEYBOARD MECHANISM

Application filed November 29, 1929. Serial No. 410,292.

This invention relates to keyboard mechanisms such as are employed in the commercial linotype machines or as illustrated in the United States patent to P. T. Dodge, No. 530,931. Ordinarily, such mechanisms comprise two series of pivoted cam yokes adapted to actuate a single series of vertical rods or reeds, which, in turn, operate the escapements controlling the release of matrices from the magazine. The cam yokes are connected to the respective finger keys of the keyboard through intermediate trip dogs, which normally sustain the cams out of contact with a pair of underlying power-driven rolls, but which, when the keys are depressed, release the yokes and allow the cams to engage the rolls for rotation thereby. As the cams are thus rotated, they swing the pivoted yokes upwardly at their free ends and operate the overlying escapement reeds, all in the manner well understood in the art.

Ordinarily, the power-driven rolls are each covered with rubber, this rubber covering being in the form of a long seamless tube or sleeve, which is slipped endwise onto the metal roll and held in place thereon. In actual practice, the life of such rubber covering tubes or sleeves is comparatively short on account of the wear to which they are subjected by the repeated engagement therewith of the rotary cams, which bear thereon with substantial pressure; in fact, oftentimes very decided grooves are cut into the rubber tubes because of this heavy pressure. As a result, it becomes necessary from time to time to remove the worn tubes from the rolls and substitute new ones, and this operation is slow and tedious, causing considerable inconvenience and loss of time.

The present invention is intended to obviate the foregoing and other objections and aims to provide for the quick and ready removal and substitution of the rubber tubes, and this in a way which will prevent the lubricating oil at the roll bearings from finding its way onto the rubber tubes when the keyboard is in operation,—a feature of importance because of the slippage which would otherwise take place between the rubber covered rolls and the rotary cams when the latter are operated by the rolls. With these ends in view, the present invention contemplates improved means in the form of a cap or nut which is of a slightly greater diameter than that of the power-driven roll, and which may be quickly attached to and detached from the roll at one end thereof, the cap thus serving not only to restrain the rubber tube against endwise displacement on the roll, but also to protect it from oil that is likely to escape from the adjacent roll bearing. In the preferred embodiment illustrated, the cap is bored to fit over the hub of the metal roll and is formed at its inner side face with an eccentric bevelled-wall recess to interlock with an eccentric bevelled-edge rib or collar formed upon the roll hub.

According to this arrangement, the rubber tube may be locked in place upon the metal roll, after being slipped endwise thereon, simply by applying the retaining cap to the roll hub and giving it (the cap) a slight rotation in either direction to cause its eccentric recess to move out of registry with the eccentric rib formed on the roll hub, the bevelled surfaces of these parts serving by such rotation of the cap to draw it tightly up against the end of the roll proper and provide a substantially fluid-tight joint between them so as thus to prevent the oil from seeping through onto the rubber tube which covers the outer surface of the roll. Due to its larger diameter, the cap will of course protrude beyond the outer surface of the metal roll and so will provide an annular shoulder to engage the rubber cover or tube and prevent it from creeping off the roll at that end. A similar cap could, if desired, be placed at the opposite end of the roll to prevent the rubber tube from working off the roll at that end, but the retaining member now employed for that purpose will serve equally as well, since the rubber tube need only be removable at one end.

In removing the tube, the retaining cap is rotated in a direction opposite to that of its locking movement, so as to bring its eccentric recess into registry with the eccentric rib on the roll hub, whereupon the cap can be slid facewise off the roll hub and allow the rubber tube to be drawn endwise from the roll.

The exact construction and operation of the parts will best be understood from the detailed description to follow, altho it will now be apparent from what has been said that the whole process of replacing a worn rubber tube by a new one can be carried out with the minimum of delay and effort.

Referring to the drawings:

Fig. 1 is a side elevation, partly in section and broken away, of a linotype keyboard mechanism equipped with the present improvements;

Fig. 2 is a detail perspective view of the improved retaining cap, a portion thereof being cut away to show the bevelled wall of its eccentric recess;

Fig. 3 is an enlarged perspective view, showing the manner in which the rubber covered roll is mounted;

Fig. 4 is a detail sectional view, showing the cap with its eccentric recess disengaged from or in registry with the eccentric locking rib of the roll hub;

Fig. 5 is a vertical section taken on the line 5—5 of Fig. 4;

Fig. 6 is a section similar to Fig. 4, showing the cap with its eccentric recess in locking engagement with or out of registry with the eccentric rib of the roll hub; and Fig. 7 is a vertical section taken on the line 7—7 of Fig. 6.

As is usual in linotype machines, the release of the matrices from their storage magazine is controlled by escapements (not shown), which are operated by a series of vertical reciprocating reeds A suitably guided in the framework and constantly urged downward by strong pull springs $A^1$ (see Fig. 1). The upward movement of the reeds against the action of their springs is effected by horizontally disposed yokes B arranged in two banks or series and with their inner ends in position to engage the reeds. At their opposite ends, the yokes are formed with vertical open slots which fit over pivot rods $B^1$; and between their ends, the yokes are provided with rotary cams or eccentrics C pivoted thereto and adapted to be rotated by the underlying power-driven rolls $D^1$, there being two of these rolls, one for each series of yokes. At their inner ends, the yokes B are supported upon pivoted trip dogs E, which hold the yokes at such height as to maintain the cams C out of engagement with the rolls D, the cams in this position of the parts being restrained against rotary motion by their engagement with fixed stop pins $C^1$. When, however, the dogs are moved, the cams C are disengaged from the stop pins $C^1$ and, as the yokes drop, actuate the latter through their contact with one or another of the rolls D in the manner previously stated. The movement of the trip dogs is controlled by a series of vertical key bars F slidably arranged in the keyboard frame and connected directly to the finger keys or key levers G.

Each of the rolls $D^1$ is covered with a rubber tube or sleeve D for frictional contact with the rotary cams C and (as best shown in Fig. 3) is formed with reduced end bearing portions or hubs $D^2$ and $D^3$, the former being journaled in a fixed bearing block $H^1$ at the left of the keyboard frame H, and the latter being journaled in a bearing sleeve or bushing $D^4$ secured by means of a set screw $h^1$ to a supporting block $H^2$ at the right of the keyboard frame. At the inner end of the sleeve $D^4$, the roll hub $D^3$ is provided with a grooved collar $D^5$ against which the end of the roll $D^1$ abuts, while at the outer end of the sleeve, the roll hub (extended for the purpose) is provided with a driving gear $D^6$, which meshes with a similar gear $D^7$ (Fig. 1) secured to the other power-driven roll. The collar $D^5$, being of slightly greater diameter than that of the roll $D^1$, presents an annular shoulder for engagement with the right-hand end of the rubber covering tube D and thus prevents any endwise movement of the tube toward the right. It will be observed, however, (see Fig. 3) that the diameter of the sleeve $D^4$, is slightly greater than that of the collar $D^5$ or the outer diameter of the rubber tube D, so that by loosening the set screw $h^1$ the roll $D^1$ and all parts carried thereby may be shifted axially (for removal or replacement) through the aperture which accommodates the sleeve $D^4$ in the supporting block $H^2$.

The sleeve $D^4$ is formed with the customary "spot" or recess wherein the set screw $h^1$ engages and also with a radially disposed oil duct $d^1$, which registers with an aperture $h^2$ formed in the block $H^2$ to permit lubrication of the bearing. It is necessary, therefore, to locate the sleeve in definite relation to the block $H^2$, and the means usually employed for this purpose (see Fig. 3) consists of a stud or pin $d^2$, which projects radially from the sleeve $D^4$ and seats in an open notch $h^3$ formed in the right end of the block $H^2$. This arrangement, while permitting the roll to be quickly removed, insures the correct angular location of the bearing sleeve within its supporting block before the roll can be pushed home in its bearings. As shown clearly in Fig. 3, the collar $D^5$ is formed with an annular groove $d^3$ which is adapted to intercept and deflect any oil escaping from the bearing sleeve $D^4$ or block $H^2$ before it comes in contact with the rubber cover D.

The parts, so far described, in construction and mode of operation, are substantially the same as those embodied in the commercial linotype machine or as illustrated in the Dodge patent hereinbefore mentioned.

According to the present invention, in order to retain the rubber tube D in its proper position on the metal roll $D^1$ against the collar $D^5$ and thus prevent it from creeping endwise toward the left, there is provided a knurled cap or nut J, which may be quickly applied and locked to the roll or as quickly unlocked and detached from the roll when the latter is removed from the keyboard frame. The cap J (as best shown in Figs. 4 and 6) is formed with a central bore $J^4$ to fit loosely on the roll hub $D^2$ and normally occupies a position between the inner end of the bearing block $H^1$ and the adjacent end face $D^8$ of the roll. The outer edge or periphery of the cap, however, overlaps or protrudes beyond the outer surface of the roll $D^1$ so as to engage the rubber tube D which as clearly shown in Figs. 4 and 6 terminates flush with the end face $D^8$.

Immediately adjacent the end face $D^8$, the roll hub $D^2$ is provided with a circular eccentrically located rib or collar $D^{10}$, which may be integral with or otherwise permanently secured to the hub. The outer surface or periphery $D^9$ of the rib $D^{10}$ (see Figs. 4 and 6) is beveled or cone-shaped in the direction of the end face $D^8$, and the size of said rib is such that it will enter a circular recess $J^1$ formed in the roll engaging face of the cap J when the latter is moved axially up against the end face $D^8$ of the roll.

The recess $J^1$, like the rib $D^{10}$, is disposed eccentrically of the roll hub $D^2$ and presents a correspondingly bevelled or cone-shaped peripheral surface $J^5$ to cooperate with the bevelled surface $D^9$ of the rib $D^{10}$. The diameter of the recess $J^1$ is only slightly greater than that of the rib $D^{10}$, so that when the latter enters the same as permitted by the registration of the two (see Figs. 4 and 5), a slight turn of the cap relatively to the roll hub is sufficient to cause the cooperating bevelled surfaces $D^9$ and $J^5$ to become frictionally engaged and interlocked (see Figs. 6 and 7). In this way, the cap J is locked securely to the power-driven roll $D^1$ to hold its rubber cover D in place thereto, and, at the same time, it is clamped tightly against the end face $D^8$ of the roll to provide an oil-tight joint at this point and thus protect the rubber tube or cover D from any of the lubricant that may escape through the cap from the adjacent bearing $H^1$. In its outer periphery, the cap J is also formed, as will be noted by reference to Figs. 4 and 5, with a plurality of annular grooves and ribs $J^2$, $J^3$, which are adapted to receive and deflect such oil that finds its way onto the exterior surfaces of the cap.

It will now be seen that, when it is desired to replace a worn or mutilated rubber tube D from the power-driven roll $D^1$, the whole roll ensemble, after first loosening the set screw $h^1$, is removed endwise through the supporting block $H^2$ at the right in the manner previously described, and the cap J then given a partial turn to disengage it from the rib $D^{10}$, whereupon the cap may be slid facewise off the roll hub $D^2$ due to the registration of the eccentric recess $J^1$ with said eccentric rib $D^{10}$. The old rubber cover is then free to be drawn endwise from the roll and a new one placed thereon in similar fashion. With the new cover in place, the cap J is reapplied to the hub $D^2$ and pushed facewise up against the end shoulder $D^8$ of the roll, whereupon by a partial turn in either direction the cap will be relocked to the roll in its cover retaining and oil protecting position, and the roll ensemble thus made ready for restoration through the supporting block $D^3$ to the keyboard frame.

When the keyboard is in use, the power-driven rolls will be rotated continuously, and it will be understood that the retaining cap J will be rotated therewith, sufficient clearance being allowed between the cap and the adjacent bearing $H^1$ to permit such rotation to take place freely. If however, the cap should be accidentally turned to bring its eccentric recess $J^1$ in register with the eccentric rib $D^{10}$, the bearing $H^1$ will prevent the cap from moving axially far enough to disturb the engaging relation of the bevelled surfaces $J^5$ and $D^9$. Hence the continued rotation of the parts will almost instantly effect the reengagement of the bevelled surfaces, which will then draw the cap away from the bearing $H^1$ and clamp it tightly up against the end face $D^8$ of the roll.

In the accompanying drawings, the invention is shown merely in preferred form and by way of example, but, obviously, many changes and variations may be made therein and in its mode of application, which will still be comprised within its spirit. It should, therefore, be understood that the invention is not limited to any specific form or embodiment, except insofar as such limitations are specified in the following claims.

Having thus described my invention, what I claim is:

1. In a keyboard mechanism of the class described, the combination of a power-driven roll for operating the cams, a rubber covering-tube removably mounted on the roll, means for preventing endwise movement of the rubber tube upon the roll in one direction, and a quick detachable cap also mounted on the roll for preventing endwise movement of the rubber tube in the opposite direction.

2. In a keyboard mechanism of the class described, the combination of a power-driven roll for operating the cams, a rubber covering-tube removably mounted on the roll, means for preventing endwise movement of the rubber tube upon the roll in one direction, a retaining cap slidably mounted on one end of the roll for preventing endwise movement of the rubber tube in the opposite direction, and releasable means for locking the cap against axial movement in its active position.

3. In a keyboard mechanism of the class described, the combination of a power-driven roll for operating the cams, a rubber covering-tube removably mounted on the roll, means for preventing endwise movement of the rubber tube upon the roll in one direction, a cap detachably mounted on one end of said roll for preventing endwise movement of the rubber tube in the opposite direction, and means adapted by a partial rotation of the cap for locking it in its active position.

4. In a keyboard mechanism of the class described, the combination of a power-driven roll for operating the cams, a rubber covering-tube removably mounted on the roll, means for preventing endwise movement of the rubber tube upon the roll in one direction, a cap detachably mounted on one end of said roll for preventing endwise movement of the rubber tube in the opposite direction, and means adapted by a partial rotation of the cap in either direction for locking it in its active position.

5. In a keyboard mechanism of the class described, the combination of a power-driven roll for operating the cams, a rubber covering-tube removably mounted on the roll, means for preventing endwise movement of the rubber tube upon the roll in one direction, a retaining cap mounted on one end of the roll for preventing endwise movement of the rubber tube in the opposite direction, said cap being removable from the roll in an axial direction, and an eccentric member located permanently on the roll and adapted by a partial rotation of the cap in opposite directions to lock the latter against axial movement in its active position or to release it preparatory to removal.

6. In a keyboard mechanism of the class described, the combination of a power-driven roll for operating the cams, a rubber covering-tube removably mounted on the roll, means for preventing endwise movement of the rubber tube upon the roll in one direction, an eccentrically recessed cap for preventing endwise movement of the rubber tube in the opposite direction, said cap being slidably mounted for axial movement upon the bearing hub at one end of the roll, and means for locking the cap in its active position against axial movement, such means comprising an eccentric member formed on the roll hub and adapted to be engaged with the walls of the recess in the cap by a relative partial rotation of the cap and roll.

7. In a keyboard mechanism of the class described, the combination of a power-driven roll for operating the cams, a rubber covering-tube removably mounted on the roll, means for preventing endwise movement of the rubber tube upon the roll in one direction, an eccentrically recessed cap for preventing endwise movement of the rubber tube in the opposite direction, said cap being slidably mounted for axial movement upon the bearing hub at one end of the roll, and means for locking the cap in its active position against axial movement, said means comprising an eccentric member formed on the roll hub and bevelled at its outer edge so as to engage with correspondingly bevelled inner walls of the recess formed in the cap when the latter is given a partial turn in either direction.

8. In a keyboard mechanism of the class described, the combination of a power-driven roll for operating the cams, a rubber covering-tube removably mounted on the roll, means for preventing endwise movement of the rubber tube upon the roll in one direction, a cap detachably mounted on the roll for preventing endwise movement of the rubber tube in the opposite direction, and means for locking the cap in its active position, said cap being formed in its outer periphery with an annular groove to intercept the lubricating oil escaping from the roll bearings.

9. In a keyboard mechanism of the class described, the combination of a power-driven roll for operating the cams, a rubber covering-tube removably mounted on the roll, means for preventing endwise movement of the rubber tube upon the roll in one direction, a cap detachably mounted on the roll for preventing endwise movement of the rubber tube in the opposite direction, and means adapted by a partial rotation of the cap for locking it in its active position, said cap being formed in its outer periphery with a plurality of annular grooves for intercepting the lubricating oil escaping from the roll bearings.

10. In a keyboard mechanism of the class described, the combination of a power-driven roll for operating the cams, a rubber covering-tube removably mounted on the roll, means for preventing endwise movement of the rubber tube upon the roll in one direction, an externally grooved cap detachably mounted on the roll for preventing endwise movement of the rubber tube in the opposite direction, and means adapted by a partial rotation of the cap for locking it in its active position, said locking means comprising an eccentric member formed on the roll and having its outer edge bevelled for engagement with a correspondingly bevelled-wall recess formed in the roll engaging face of the cap.

11. In a keyboard mechanism of the class described, the combination of a power-driven roll for operating the cams, a rubber covering-tube removably mounted on the roll, said roll presenting a shoulder at one end flush with the rubber tube, a locking member formed on the roll and located immediately adjacent said end shoulder, means for preventing endwise movement of the rubber tube upon the roll in one direction, and a quick detachable externally grooved cap for preventing endwise movement of the rubber tube in the opposite direction, said cap and locking member being formed with correspondingly bevelled surfaces adapted by their engagement through a partial rotation of the cap to lock the latter in its active position against the end shoulder of the roll.

12. In or for a keyboard mechanism of the class described, a power-driven cam operating roll formed at one end with a reduced end portion or bearing hub, a rubber covering-tube mounted on the roll and removable endwise therefrom at that end, and a retaining cap for holding the rubber tube in place upon the roll, said cap being detachably mounted on the roll and presenting an annular shoulder for engagement with the end of the rubber tube.

13. In or for a keyboard mechanism of the class described, a power-driven cam operating roll formed at one end with a reduced end portion or bearing hub, a rubber covering-tube mounted on the roll and removable endwise therefrom at that end, and a retaining cap for holding the rubber tube in place upon the roll, said cap being detachably mounted on the roll hub and presenting an annular shoulder for engagement with the end of the rubber tube.

14. In or for a keyboard mechanism of the class described, a power-driven cam operating roll formed at one end with a reduced end portion or bearing hub, a rubber covering-tube mounted on the roll and removable endwise therefrom at that end, a retaining cap centrally bored to fit loosely upon the roll hub and presenting an annular shoulder for engagement with the end of the rubber tube, and releasable means adapted by a partial rotation of the cap for locking it in its tube retaining position.

15. A keyboard roll arrangement as in claim 14, characterized by the fact that the retaining cap therein referred to is formed with an eccentrically located recess, and that the roll hub is provided with an eccentrically located rib to enter said recess and be frictionally engaged therewith by a partial rotation of the cap.

16. In or for a keyboard mechanism of the class described, a power-driven cam operating roll formed at one end with a reduced end portion or bearing hub, a rubber covering-tube mounted on the roll and removable endwise therefrom at that end, a retaining cap for holding the rubber tube in place upon the roll, said cap being centrally bored to fit loosely upon the roll hub and presenting a side face adapted to make fluid-tight contact with the end face of the roll proper, and means adapted by a partial rotation of the cap with reference to the roll hub to draw the side face of the cap tightly up against the end face of the roll.

17. In or for a keyboard mechanism of the class described, a power-driven cam operating roll formed at one end with a reduced end portion or bearing hub, a rubber covering-tube mounted on the roll and removable endwise therefrom at that end, a retaining cap for holding the rubber tube in place upon the roll, said cap being centrally bored to fit loosely upon the roll hub and presenting a side face adapted to make fluid-tight contact with the end face of the roll proper, and cam surfaces formed partly on the roll and partly on the cap and adapted to be engaged by a partial rotation of the cap with reference to the roll hub for drawing the side face of the cap tightly up against the end face of the roll.

18. In or for a keyboard mechanism of the class described, a power-driven cam operating roll formed at one end with a reduced end portion or bearing hub, a rubber covering-tube mounted on the roll and removable endwise therefrom at that end, a retaining cap for holding the rubber tube in place upon the roll, said cap being centrally bored to fit loosely upon the roll hub and presenting a side face adapted to make fluid-tight contact with the end face of the roll proper, a circular eccentrically located bevelled-wall recess formed in the roll contacting face of the retaining cap, and a circular eccentrically located bevelled-edge rib or collar formed on the roll hub immediately adjacent the roll end face and adapted to enter the cap recess, the bevelled surfaces of the rib and cap recess being adapted to be engaged and disengaged by a partial rotation of the cap upon the roll hub, substantially as and for the purpose described.

In testimony whereof, this specification has been duly signed by:

HAROLD A. BURT.